United States Patent
Wang et al.

(10) Patent No.: US 12,518,084 B2
(45) Date of Patent: Jan. 6, 2026

(54) METHOD FOR EDITING PDF PAGE TEXT ON WEB PAGE

(71) Applicant: Fujian Foxit Software Development Joint Stock Co., Ltd., Fuzhou (CN)

(72) Inventors: Jinming Wang, Fuzhou (CN); Zhiquan Ye, Fuzhou (CN)

(73) Assignee: Fujian Foxit Software Development Joint Stock Co., Ltd., Fuzhou (CN)

( * ) Notice: Subject to any disclaimer, the term of this patent is extended or adjusted under 35 U.S.C. 154(b) by 321 days.

(21) Appl. No.: 18/465,364

(22) Filed: Sep. 12, 2023

(65) Prior Publication Data
US 2024/0028817 A1    Jan. 25, 2024

(30) Foreign Application Priority Data

Jul. 21, 2022   (CN) .......................... 202210863772.2

(51) Int. Cl.
G06F 17/00       (2019.01)
G06F 40/106     (2020.01)
G06F 40/166     (2020.01)

(52) U.S. Cl.
CPC .......... *G06F 40/166* (2020.01); *G06F 40/106* (2020.01)

(58) Field of Classification Search
CPC .... G06F 40/166; G06F 40/106; G06F 16/958; G06T 11/60; G06T 2200/24
See application file for complete search history.

(56) References Cited

U.S. PATENT DOCUMENTS 8,443,299 B1 *  5/2013  Chanda .................. G06F 9/451
                                                              715/802
12,411,896 B1 * 9/2025  Selman .................. G06F 16/93
(Continued)

FOREIGN PATENT DOCUMENTS

AU       2017210597 A1    2/2018
CN         102314314 B     8/2015
(Continued)

OTHER PUBLICATIONS

Chinese Search Report of CN202210863772.2 dated Aug. 11, 2023, 6 pages.

*Primary Examiner* — Laurie A Ries
(74) *Attorney, Agent, or Firm* — Rankin, Hill & Clark LLP

(57) ABSTRACT

The present disclosure discloses a method for editing pdf page text on a web page, wherein the method is provided with a timer, and a filling bitmap and a cursor bitmap are alternately displayed at timed intervals of the timer to simulate a cursor flashing effect and prompt a user for a current input position. A data layer acquires in real time a code of a key which is input by a user; when the data layer receives that the code of the key, which is input by the user is a character, the character corresponding to the code of the key is inserted into a first position, and a timer is paused simultaneously; after the character is inserted, the cursor is located at a second position, and then an updated region is calculated, an updated bitmap is drawn and sent to a web page which displays the updated bitmap on the updated region, wherein the updated region is a region in the text content where a position of a character changes before and after the character is input. The method of the present disclosure uniformly processes both a displayed text and an edited text by a data layer, so that an appearance of a text in (Continued)

a reading mode is highly consistent with an appearance of a text in an editing mode, achieving an effect of "what you see is what you get".

7 Claims, 1 Drawing Sheet

(56) References Cited

U.S. PATENT DOCUMENTS

| | | | | |
|---|---|---|---|---|
| 2014/0337699 | A1* | 11/2014 | Tang | G06F 3/04842 715/205 |
| 2016/0092420 | A1* | 3/2016 | Cesena | G06F 40/174 715/759 |
| 2017/0220530 | A1* | 8/2017 | Chaudhry | G06F 40/114 |
| 2018/0039606 | A1* | 2/2018 | Lysenko | G06F 40/143 |
| 2019/0317980 | A1* | 10/2019 | Dhanuka | G06F 40/109 |
| 2020/0218490 | A1* | 7/2020 | Noyes | G06F 40/197 |
| 2021/0004526 | A1* | 1/2021 | Kahn | G06F 16/84 |
| 2021/0026508 | A1* | 1/2021 | Jacobs | G06T 1/20 |

FOREIGN PATENT DOCUMENTS

| | | | | |
|---|---|---|---|---|
| CN | 107977346 A | | 5/2018 | |
| CN | 108009143 A | | 5/2018 | |
| CN | 109657220 A | | 4/2019 | |
| CN | 111476006 A | | 7/2020 | |
| CN | 112015700 A | * | 12/2020 | G06F 40/106 |
| CN | 112417826 A | | 2/2021 | |
| CN | 112068826 B | * | 2/2024 | G06F 8/38 |
| CN | 120256685 A | * | 7/2025 | |
| CN | 120416559 A | * | 8/2025 | |
| CN | 120447804 A | * | 8/2025 | |
| WO | WO-2016032267 A1 | * | 3/2016 | G06F 17/00 |
| WO | WO-2020042815 A1 | * | 3/2020 | G06F 3/0484 |

* cited by examiner the Quick Access toolbar.

FIG. 1a the Quick Access toolbar.

FIG. 1b the Quick Access toolbar.

FIG. 2a the Quick Access toolbar.

FIG. 2b

METHOD FOR EDITING PDF PAGE TEXT ON WEB PAGE

TECHNICAL FIELD

The present disclosure relates to the field of pdf document processing, in particular, to a method for editing pdf page text on a web page.

BACKGROUND

Opening and displaying a pdf document directly on a web page is the premise of editing the content of a pdf document directly on a web page. In order to realize the function of opening and displaying a pdf document directly on a web page, a common practice in the industry is to realize the function based on a WebAssembly technology.

The Webassembly technology is a technology running on a browser, which can directly compile the source code of C/C++ into javascript script and directly execute on the web page. Since the C/C++ is a very efficient language, it can still guarantee high efficiency (close to that of the native C++ language) after WebAssembly transformation, which is also much higher than that of javascript. Since there is a mature pdf parsing and rendering engine which can be written by C++ language, the pdf document parsing and rendering technology which has been implemented by C++ can be easily translated into a WebAssembly bytecode library through the WebAssembly technology, which can run directly on the web page platform.

The basic process of using WebAssembly technology to realize the function of directly opening and displaying pdf documents on web page is as follows: when the pdf document is opened, the pdf document is transferred to the WebAssembly bytecode library (may be referred to as "a data layer"); the data layer parses the pdf document, renders the specified page into a bitmap, and finally returns the bitmap to the web page layer; and the web page layer is responsible for displaying the bitmap for a user to view. This has the effect of opening the document and displaying the pdf page.

In order to realize interactive editing of text content in a pdf page on a web page, a common technical solution in the industry is to use native elements of the web page to display and edit pdf text content. That is, when editing a certain piece of text in a pdf page, it is a common practice to create a div element and fill the content of the text in this div, and simultaneously, it needs to ensure that the font and size and position information used by the div are consistent with those in the original pdf document. The details are as follows:

Step 1: selecting, by the user, the text content on the pdf page; and preparing for editing;

Step 2: according to the size of the text content selected by the user, creating a div element of the same size as the text content, and covering the div element onto the text content, and simultaneously deleting the text content originally selected by the user located below;

Step 3: filling the text content into the div container according to the information such as the text content, font, font style and style, and simultaneously matching the approximate font existing on the current web page, and adjusting the style of the text content in the div so that it is consistent with the style of the original pdf document;

Step 4: at this time, entering an editing state, since the original elements of the web page can be used inside the div, and the original elements thereof support operations such as inputting a character, displaying and deleting by a user, so that the user can directly perform editing operations on the contents of the div elements without additional processing; and Step 5: after the user exiting the edit state, generating a new page content from the text content and font information within the div element, and rewriting the new page content back on the pdf page; finally, destroying the div element.

However, the above implementation has the following problems:

In general, the effect that a text exhibits in editing mode and in reading mode should be consistent. However, since the above-mentioned implementation scheme relies on the original elements of the web page to present the text in an edited state, in order to keep the display effect consistent with that of the original pdf document as much as possible, the closest font of the web page needs to be matched for display, but the matching effect cannot be 100% perfect. Because the font web pages of pdf documents do not necessarily exist, there can only be approximate matches. Therefore, in order to achieve a consistent experience of the effect of the input text, under this technical solution, the font and appearance of the original text may have to be modified, and the text content in the original pdf document is displayed by uniformly using an approximate font in the editing state, which results in that after going into the editing state, the appearance of the original text (such as the font and the size and position of the text) in the pdf page may also be changed, resulting in the problem that the text display is inconsistent between the user when 'reading' and when 'editing', for example, FIG. 1a is the appearance of the text in a reading mode for a text content. FIG. 1B shows the appearance of text in the editing mode for the text content, and it can be clearly seen that the effect of the bold text originally present in part of the text in the editing mode disappears compared to the effect in the reading mode, resulting in that the effect exhibited by the text in the editing mode is inconsistent with that exhibited in the reading mode.

SUMMARY

The present disclosure provides a method for editing pdf page text on a web page to solve the above-mentioned problems of the prior art.

In order to achieve the above object, the present disclosure provides a method for editing pdf page text on a web page, which comprises:

S1: opening a pre-edited pdf document on a web page;

S2: selecting, by a user, a text content in the pre-edited pdf document on the web page, and going into a pre-editing state, wherein at this time, a cursor is located at a first position;

S3: starting a timer with a timed interval T;

S4: after one timed interval T, drawing a cursor bitmap, and sending the cursor bitmap to a web page, wherein the web page displays the cursor bitmap at the first position, wherein a size of the cursor bitmap is the same as a size of the cursor;

S5: after one timed interval T, drawing a filling bitmap, and sending the filling bitmap to a web page, wherein the web page displays the filling bitmap at the first position, wherein a size of the filling bitmap is the same as the size of the cursor;

S6: performing step S4 and step S5 alternately without interruption in the pre-editing stage;

S7: starting to input, by a user, a character and going into an editing state;

S8: acquiring in real time, by a data layer, a code of a key which is input by a user; and when the data layer receives that the key code input by the user is a character, the character corresponding to the code of the key is inserted into the first position, and the timer is paused simultaneously; and after the character corresponding to the code of the key is inserted into the first position, the cursor is located at a second position;

S9: calculating an updated region, drawing an updated bitmap, and sending the updated bitmap to a web page, wherein the web page displays the updated bitmap on the updated region, wherein the updated region is a region in the text content where a position of a character changes before and after the character is input;

S9: restarting the timer;

S10: after one timed interval T, displaying, by the web page, the cursor bitmap at the second position;

S11: after a further one timed interval T, displaying, by the web page, the filling bitmap at the second position;

S12: performing step S10 and step S11 alternately without interruption until the data layer acquires a next character; and S13: after the user inputs the next character, repeatedly performing steps S8-S12.

In an embodiment of the present disclosure, the timed interval T is 500 ms.

In an embodiment of the present disclosure, the cursor bitmap is in a "vertical line" style.

In an embodiment of the present disclosure, the filling bitmap is white; or has the same color as the background of the web page below the filling bitmap.

In an embodiment of the present disclosure, a data layer acquires in real time a code of a key which is input by a user, and when the code of the key corresponds to a direction key indicating upward, downward, leftward and rightward on a keyboard, then a cursor is respectively moved to a corresponding direction by one character from a current position.

In an embodiment of the present disclosure, a data layer acquires in real time a code of a key which is input by a user, and when the code of the key corresponds to a "Del" key, following steps are executed:

S21: deleting a first character after a position where the cursor is located, and simultaneously pausing the timer, wherein at this time the cursor is located at a third position;

S22: calculating an updated region, drawing an updated bitmap, and sending the updated bitmap to a web page, wherein the web page displays the updated bitmap on the updated region, wherein the updated region is a region in the text content where a position of a character changes before and after the character is input;

S23: restarting the timer;

S24: after one timed interval T, displaying, by the web page, the cursor bitmap at the third position;

S25: after a further one timed interval T, displaying, by the web page, the filling bitmap at the third position;

S26: performing steps S24 and S25 alternately without interruption until the data layer acquires a next code of a key.

In an embodiment of the present disclosure, the data layer determines whether the character input by the user can be displayed in a font in the text content, and if yes, makes a font of the inserted character the same as the font in the text content, and if not, further filters and selects an approximate font similar to the font in the text content, so that a font of the inserted character is the same as the approximate font.

The method for editing pdf page text on a web page provided by the present disclosure uniformly processes both a displayed text and an edited text by the data layer, so that an appearance of a text in a reading mode is highly consistent with an appearance of a text in an editing mode, achieving an effect of "what you see is what you get".

BRIEF DESCRIPTION OF THE DRAWINGS

In order to explain the embodiments of the present disclosure or the technical solutions in the prior art more clearly, a brief description will be given below with reference to the accompanying drawings which are used in the description of the embodiments or the prior art, and it is obvious that the drawings in the description below are merely some embodiments of the present disclosure, and it would have been obvious for a person skilled in the art to obtain other drawings according to these drawings without involving any inventive effort.

FIG. 1a shows the appearance of a text in reading mode for a text content;

FIG. 1B shows the appearance of the text in the editing mode for the text content;

FIG. 2a shows the appearance of a text in reading mode for a text content;

FIG. 2b shows the appearance of text in the editing mode for the text content.

DETAILED DESCRIPTION

The embodiments of the present disclosure will now be described more fully hereinafter with reference to the accompanying drawings, in which embodiments of the present disclosure are shown. It is to be understood that the embodiments described are only a few, but not all embodiments of the present disclosure. Based on the embodiments of the present disclosure, all other embodiments obtained by a person skilled in the art without inventive effort fall within the scope of the present disclosure.

The present disclosure provides a method for editing pdf page text on a web page, which comprises:

S1: opening a pre-edited pdf document on a web page;

since the use case for which the present disclosure is directed is editing pdf on a web page, the present disclosure needs to open a pre-edited pdf document on the web page when it is executed.

S2: selecting, by a user, a text content in the pre-edited pdf document on the web page, and going into a pre-editing state, wherein at this time, a cursor is located at a first position;

the text content selected by the user is a continuous text content, and can be located in the same line or across multiple lines, and the cursor is located within the text content, for example, the cursor is located at the top of the text, the end of the text or between any two characters in the text. In a special case, if the text contents are arranged vertically, the text contents may be located in the same column or span multiple columns, and the present disclosure does not limit the arrangement mode of the text contents and also does not limit the number of characters of the text contents, and in a special case, the text contents may be all the text of the current pdf page.

S3: starting a timer with a timed interval T;

in this embodiment, the timer interval is 500 ms, and the timer interval is an interval of simulated cursor flashing, and it can be determined according to actual needs that the shorter the timer interval is, the higher the frequency of cursor flashing is presented, and conversely, the lower the flashing frequency is presented.

S4: after one timed interval T, drawing a cursor bitmap and sending the cursor bitmap to a web page, wherein the web page displays the cursor bitmap at the first position, wherein a size of the cursor bitmap is the same as a size of the cursor;

At this time, the cursor bitmap is displayed, and the simulated effect is that the cursor is in the display state during the cursor flashing process. A common cursor bitmap is a 'vertical line' style, which can be used in the present disclosure, and other styles having a reminding function can also be used, and the present disclosure is not limited thereto.

S5: after one timed interval T, drawing a filling bitmap, and sending the filling bitmap to a web page, wherein the web page displays the filling bitmap at the first position, wherein a size of the filling bitmap is the same as the size of the cursor;

the filling bitmap is now displayed and the effect of the simulation is that the cursor disappears during the flashing of the cursor. The filling bitmap may be, for example, white; or has the same color as the background of the web page below the filling bitmap, in which case the user visually perceives that the cursor is in a completely disappeared state and the rendering effect is more natural.

S6: performing step S4 and step S5 alternately without interruption in the pre-editing stage;

wherein steps S4 and S5 are alternated to simulate the flashing of the cursor, and continue uninterrupted if there is no subsequent operation.

S7: starting to input, by a user, a character and going into an editing state;

S8: acquiring in real time, by a data layer, a code of a key which is input by a user; and when the data layer receives that the code of the key, which is input by the user is a character, the character corresponding to the code of the key is inserted into the first position, and the timer is paused simultaneously; and after the character corresponding to the code of the key is inserted into the first position, the cursor is located at a second position;

After inputting the character, since the character has a certain size, the second position is located after the first position, and the distance between the first position and the second position can be calculated according to the size of the character and the space (if any) between the characters. In addition, the character input in this step may be one character or a plurality of characters in succession, and when there are a plurality of characters, the execution of subsequent steps will not be affected, and a person skilled in the art will understand the present disclosure, the description thereof will not be repeated.

A timer is paused, since the purpose of the timer is to simulate the cursor flashing effect, and the timer is in the process of input at this time, and the position of the cursor is uncertain (the size and number of specific input characters are unclear), and the cursor flashing effect is not displayed.

S9: calculating an updated region, drawing an updated bitmap. and sending the updated bitmap to a web page, wherein the web page displays the updated bitmap on the updated region, wherein the updated region is a region in the text content where a position of a character changes before and after the character is input;

After the character is input, the content that should be displayed at the original first position is changed from the cursor between to the first character input (the first character input if there are multiple characters input, and the character input if there is only one character input). When there are a plurality of input characters, the content which should be displayed at the back terminal of the first position also changes, and the present disclosure updates all the areas where the change in character position occurs as updated regions to ensure that the user's visible effect is consistent with the actual input, and in presentation, is consistent with the effect of inputting characters in a word document.

S9: restarting the timer;

when the character input by the user has been updated and displayed, the cursor flashing effect can be restarted to prompt the user to continue the input.

S10: after one timed interval T, displaying, by the web page, the cursor bitmap at the second position;

S11: after a further one timed interval T, displaying, by the web page, the filling bitmap at the second position;

S12: performing step S10 and step S11 alternately without interruption until the data layer acquires a next character; and S13: after the user inputs the next character, repeatedly performing steps S8-S12.

In step S7, in addition to inputting a character, the user may also need to adjust the position of the cursor to change the position of the input character, and the steps are as follows:

a data layer acquires in real time a code of a key which is input by a user, and when the code of the key corresponds to direction keys indicating upward, downward, leftward and rightward on a keyboard, a cursor is respectively moved to a corresponding direction from a current position, and each time the user presses a direction key, the cursor is moved to a corresponding direction by one character.

In addition to inputting a character, the user may also need to delete the character. When the character needs to be deleted, the "Del" key is pressed as follows:

a data layer acquires in real time a code of a key which is input by a user, and when the code of the key corresponds to a "Del" key, following steps are executed:

S21: deleting a first character after a position where the cursor is located, and simultaneously pausing the timer, wherein at this time the cursor is located at a third position;

S22: calculating an updated region, drawing an updated bitmap, and sending the updated bitmap to a web page, wherein the web page displays the updated bitmap on the updated region, wherein the updated region is a region in the text content where a position of a character changes before and after the character is input;

As with the input characters, the updated region needs to be calculated after deleting characters so that the user's visual effect is consistent with the actual character change.

S23: restarting the timer;

S24: after one timed interval T, displaying, by the web page, the cursor bitmap at the third position;

S25: after a further one timed interval T, displaying, by the web page, the filling bitmap at the third position;

S26: performing steps S24 and S25 alternately without interruption until the data layer acquires a next code of a key.

In addition to the "Del" key, the "Backspace" key is also used to delete characters. Unlike the "Del" key, the "Backspace" key is used to delete the first character before the cursor position, and other steps are performed with reference to the above steps.

In the present disclosure, in order to make the user more visible, following steps are further performed: the data layer determines whether the character input by the user can be displayed in a font in the text content, and if yes, makes a font of the inserted character the same as the font in the text content, and if not, further filters and selects an approximate font similar to the font in the text content, so that a font of the inserted character is the same as the approximate font.

As shown in FIG. 2a, the appearance of a text in a reading mode is shown for a text content, and as shown in FIG. 2b, the appearance of a text in an editing mode is shown for the text content. Since the same font as that in the text content is used for display in the editing mode, the appearance effects of the two are consistent, and there is no problem of inconsistent appearance when the reading mode and the editing mode in the prior art.

The method for editing pdf page text on a web page provided by the present disclosure uniformly processes both a displayed text and an edited text by the data layer, so that an appearance of a text in a reading mode is highly consistent with an appearance of a text in an editing mode, achieving an effect of "what you see is what you get".

A person skilled in the art will appreciate that the figures are merely schematic illustrations of an embodiment, and the blocks or flows in the figures are not necessarily required to practice the present disclosure.

A person skilled in the art will appreciate that modules in an apparatus in an embodiment may be distributed throughout an apparatus in an embodiment as described in the embodiment, or may be varied accordingly in one or more apparatuses other than this embodiment. The modules of the above embodiments may be combined into one module or further split into a plurality of sub-modules.

Finally, it should be noted that: the above embodiments are only used to illustrate the technical solution of the present disclosure, and not to limit the same; while the present disclosure has been described in detail and with reference to the foregoing embodiments, it will be understood by a person skilled in the art that: the technical solutions described in the foregoing embodiments may still be modified, or some technical features may be equivalently replaced; and these modifications or substitutions do not depart from the spirit and scope of the corresponding technical solutions of the embodiments of the present disclosure.

The invention claimed is:

1. A method for editing pdf page text on a web page, comprising:
S1: opening a pre-edited pdf document on a web page;
S2: selecting, by a user, a text content in the pre-edited pdf document on the web page, and going into a pre-editing state, wherein at this time, a cursor is located at a first position;
S3: starting a timer with a timed interval T;
S4: after one timed interval T, drawing a cursor bitmap, and sending the cursor bitmap to a web page, wherein the web page displays the cursor bitmap at the first position, wherein a size of the cursor bitmap is the same as a size of the cursor;
S5: after one timed interval T, drawing a filling bitmap, and sending the filling bitmap to a web page, wherein the web page displays the filling bitmap at the first position, wherein a size of the filling bitmap is the same as the size of the cursor;
S6: performing step S4 and step S5 alternately without interruption in the pre-editing stage;
S7: starting to input, by a user, a character and going into an editing state;
S8: acquiring in real time, by a data layer, a code of a key which is input by a user; and when the data layer receives that the code of the key, which is input by the user is a character, the character corresponding to the code of the key is inserted into the first position, and the timer is paused simultaneously; and after the character corresponding to the code of the key is inserted into the first position, the cursor is located at a second position;
S9: calculating an updated region, drawing an updated bitmap and sending the updated bitmap to a web page, wherein the web page displays the updated bitmap on the updated region, wherein the updated region is a region in the text content where a position of a character changes before and after the character is input;
S9: restarting the timer;
S10: after one timed interval T, displaying, by the web page, the cursor bitmap at the second position;
S11: after a further one timed interval T, displaying, by the web page, the filling bitmap at the second position;
S12: performing step S10 and step S11 alternately without interruption until the data layer acquires a next character; and
S13: after the user inputs the next character, repeatedly performing steps S8-S12.

2. The method for editing pdf page text on a web page according to claim 1, wherein the timed interval T is 500 ms.

3. The method for editing pdf page text on a web page according to claim 1, wherein the cursor bitmap is in a "vertical line" style.

4. The method for editing pdf page text on a web page according to claim 1, wherein the filling bitmap is white; or has the same color as a web page background below the filling bitmap.

5. The method for editing pdf page text on a web page according to claim 1, wherein the data layer acquires in real time a code of a key which is input by a user, and when the code of the key corresponds to a direction key indicating upward, downward, leftward and rightward on a keyboard, then a cursor is respectively moved to a corresponding direction by one character from a current position.

6. The method for editing pdf page text on a web page according to claim 1, wherein a data layer acquires in real time a code of a key which is input by a user, and when the code of the key corresponds to a "Del" key, following steps are executed:
S21: deleting a first character after a position where the cursor is located, and simultaneously pausing the timer, wherein at this time the cursor is located at a third position;
S22: calculating an updated region, drawing an updated bitmap, and sending the updated bitmap to a web page, wherein the web page displays the updated bitmap on the updated region, wherein the updated region is a region in the text content where a position of a character changes before and after the character is input;
S23: restarting the timer;
S24: after one timed interval T, displaying, by the web page, the cursor bitmap at the third position;
S25: after a further one timed interval T, displaying, by the web page, the filling bitmap at the third position;

S26: performing steps S24 and S25 alternately without interruption until the data layer acquires a next code of a key.

7. The method for editing pdf page text on a web page according to claim 1, wherein the data layer determines whether the character input by the user can be displayed in a font in the text content, and if yes, makes a font of the inserted character the same as the font in the text content, and if not, further filters and selects an approximate font similar to the font in the text content, so that a font of the inserted character is the same as the approximate font.

* * * * *